E. O. SCHWEITZER.
BRUSH FOR ELECTRICAL MACHINERY.
APPLICATION FILED FEB. 8, 1915.
1,251,827.
Patented Jan. 1, 1918.
2 SHEETS—SHEET 1.
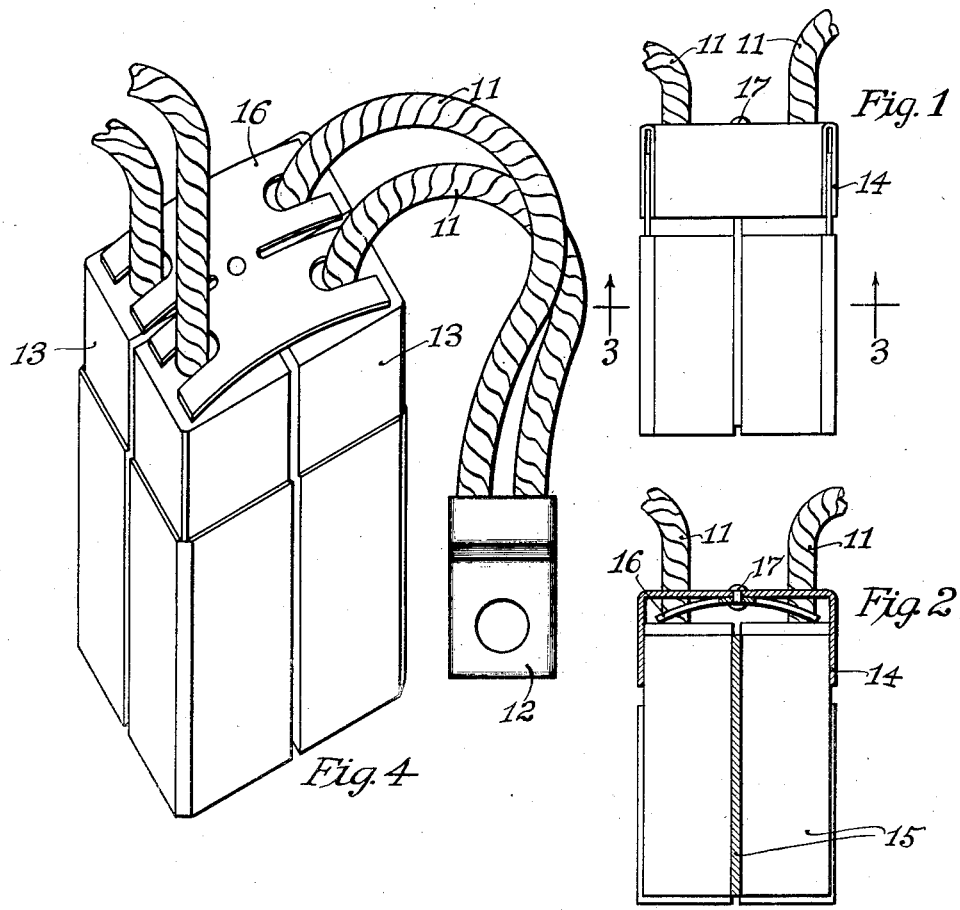
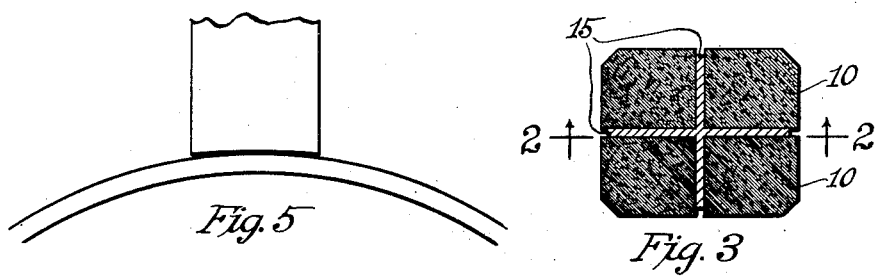
Witnesses:
Cameron A. Whitlett
Ernest W. Rapalee
Inventor
Edmund O. Schweitzer
By Brown, Hanson & Boettcher
Attorneys.

E. O. SCHWEITZER.
BRUSH FOR ELECTRICAL MACHINERY.
APPLICATION FILED FEB. 8, 1915.
1,251,827.
Patented Jan. 1, 1918.
2 SHEETS—SHEET 2.
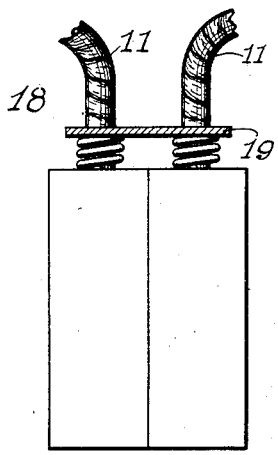
Fig. 6
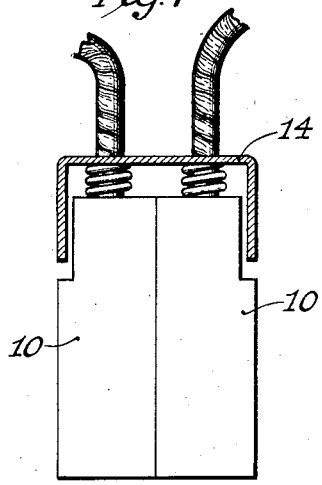
Fig. 7
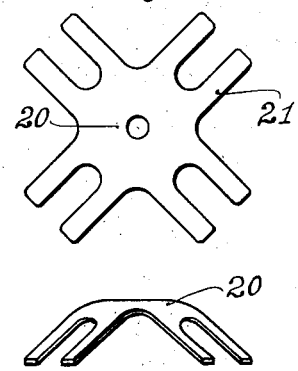
Fig. 8
Fig. 9
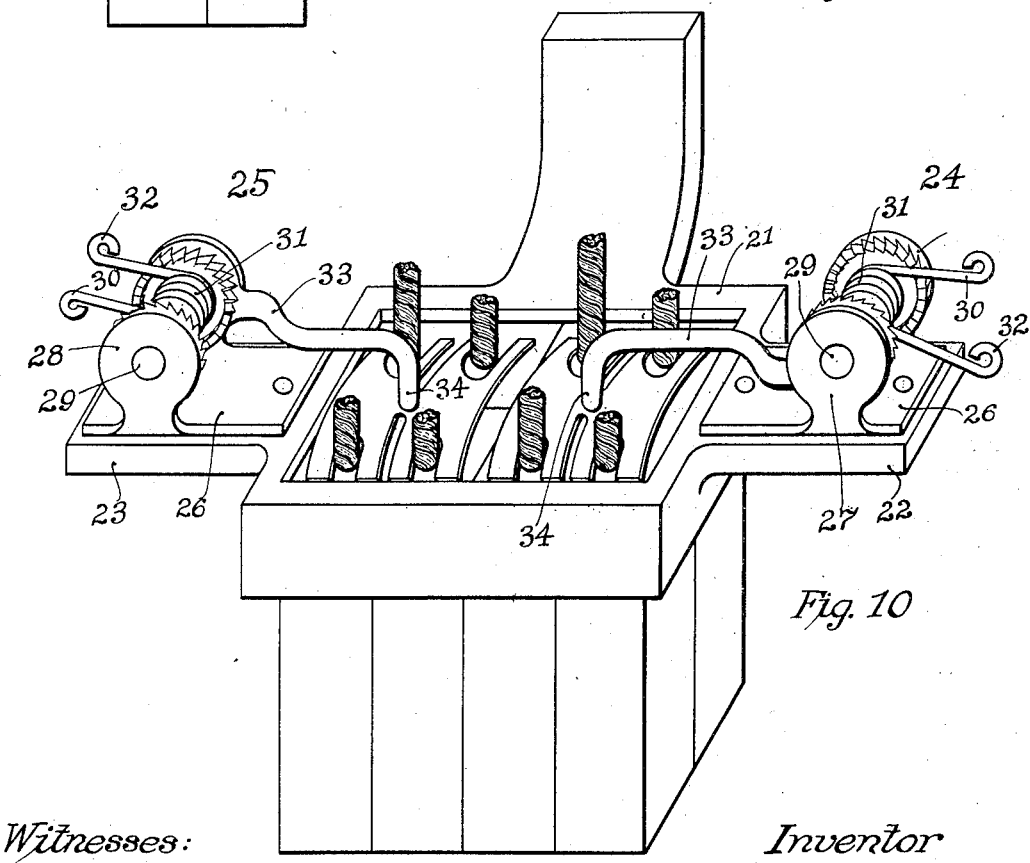
Fig. 10
Witnesses:
Cameron A. Whitsett
Ernest W. Rapalee
Inventor
Edmund O. Schweitzer
By Brown, Hanson & Poettcher
Attorneys.

:::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::

UNITED STATES PATENT OFFICE.

EDMUND O. SCHWEITZER, OF CHICAGO, ILLINOIS.

BRUSH FOR ELECTRICAL MACHINERY.

1,251,827.     Specification of Letters Patent.     Patented Jan. 1, 1918.

Application filed February 8, 1915. Serial No. 6,674.

*To all whom it may concern:*

Be it known that I, EDMUND O. SCHWEITZER, a citizen of the United States, residing at Chicago, in the county of Cook and State of Illinois, have invented certain new and useful Improvements in Brushes for Electrical Machinery, of which the following is a full, clear, concise, and exact description, reference being had to the accompanying drawings, forming a part of this specification.

This invention is an improvement in brushes for electrical machinery and, more particularly, it points out an improvement in brushes for collector rings and current commutators such as are used for making continuous contact with a sliding surface.

Brushes used for commutators in direct current machinery and collector rings in alternating-current generators, motors, and especially in rotary converters, are subject to heavy duty and have always been a source of annoyance and loss of energy.

The chief difficulty arises in the practical impossibility of maintaining a continuous mechanical bearing between the face of the brush and the collector ring or commutator. Brushes are designed to be worked at a given current density per unit of cross section, assuming that the brush always makes perfect mechanical contact over its entire cross section; but it is well nigh impossible to maintain even a fairly good surface contact between the solid-block brush and a rotating collector ring. Some of the causes of imperfect contact are uneven wear of the brushes; uneven wear of the ring or commutator; eccentricities due to imperfect turning or due to the nature of the mounting, or a grain of dirt under the brush, or impurities in the brush, or bending or bruising of the collector ring during installation or repairs, or changes in form due to changes in temperature, shifting of the brushes in the holder, etc. However, the assumption that the entire brush makes proper contact did not cause much difficulty in the use of the old carbon brushes, which were worked at a current density of only about 65 amperes per square inch; but, since the introduction of metallic or semi-metallic brushes, such, for instance, as the "Metite" brush now on the market, in which the current density is run up to about 200 amperes per square inch, the difficulty of proper brush contact has become acute. This is due to two reasons: first, the greater current density and the consequently greater heating at points of poor contact; and, second, the relatively lower fusion point of metal and the consequently greater tendency to roughen.

The object of the present invention is to provide an improved brush and to provide a holder for securing a maximum bearing surface between the brush and the moving surface. Other incidental objects are evident from the following description.

The manner in which I have attacked the problem of securing a good bearing surface between brush and ring is subdividing the brush and making each part independently movable, so that instead of having only one spot or point of contact, as was the practice in the solid block brushes, I obtain at least a spot or point for each section of the brush.

I also employ a tensioning means for applying a given total pressure to the entire brush, such that this total pressure, if equally distributed, would give a proper pressure per unit of area. Then, in order to insure a proper distribution of pressure among the sections, I provide a distributing means, this means preferably comprising a spring operating on each section, though a rocking spider may be employed, utilizing only the tension of the main tensioning means.

In the accompanying drawings which form a part of this specification I have illustrated a few typical embodiments of my invention.

Figure 1 is a side elevation of one form of brush with the leads or "pig tails" broken away;

Fig. 2 is a vertical, longitudinal cross section of the brush shown in Fig. 1, said view being taken on the lines 2—2 of Fig. 3;

Fig. 3 is a cross section taken on the lines 3—3 of Fig. 1;

Fig. 4 is an isometric view, shown on an enlarged scale, of the brush of Fig. 1, with the cap and guide removed to show the relative positions of the sections and the means for distributing the tension of the spring arms to be described later;

Fig. 5 is a diagram illustrating the manner in which imperfect contact between a brush and the collector ring occurs;

Fig. 6 is a vertical longitudinal section of a modification;

Fig. 7 is a similar view of another modification;

Fig. 8 is a plan view of a distributing spider, which may be employed instead of the other form of spider shown in the previous views;

Fig. 9 is an elevation of the same;

Fig. 10 is an isometric view of a brush-holder and brushes forming a unit structure such as is employed in generators, rotary converters, and the like;

Fig. 5 is a diagram which illustrates the action which occurs due to the rolling and pitching of the rings and due to variations of curvature of the rings caused by their mounting or the unequal expansions due to heat, and the like, whereby practically only a line contact across the face of the brush is formed. Very slight variations in curvature will cause a marked diminution in area of surface contact between the brush and the collector ring.

In the structure shown in Figs. 1 to 4 I have subdivided the block brush into four sections. The brush itself is preferably made of a mixture of metal and carbon such as is now found on the market, although these brushes may be of carbon or any preferred material. I employ the term carbon in its broad sense.

Each section 10 has attached thereto a flexible conductor commonly termed in the art a "pig tail." These pig tails 11 may be secured to the Metite brushes by soldering or by any preferred means, and are preferably joined in pairs and soldered to clips 12, which may be bolted to the busses leading off from the collector brushes. The upper part 13 of each brush section is milled away so as to form a shoulder, and a metal cap 14 fits over the reduced portion of the sections and forms a retaining means for the sections. A pair of intersecting metal partitions may be employed for guiding the sections 10, and these metal partitions are preferably secured, as by soldering, to the cap 14. The metal partitions 15 are formed of a soft metal, such as soft brass, so that they will wear away at about the same rate as the Metite brushes. A rocking spider 16 is secured to the top of the cap 14, as by a rivet 17. This rocking spider is secured rather loosely by the rivet so that the same may rock back and forth to distribute the pressure which is imposed on the cap 14 evenly among the sections, the rivet 17 serving merely as a loose link for holding the spider 16 to the cap 14. In this embodiment the spider 16 is made of a spring metal, such as spring brass, and it can be seen that, if one of the sections is pushed upward, it will tend to depress or push downward the opposite section. In this way a certain spring action and a certain rocking action are secured for distributing the pressure evenly throughout the sections, even though they are not all at the same level; that is, one or more of the sections may be at a lower or higher position than the rest of the sections.

In the modification shown in Fig. 6 the guide plates or partitions 15 have been omitted, as it is found that these are not essential to practising the invention, and instead of employing a rocking spring plate 16, as previously described, a rigid plate 18 may be employed for distributing the pressure to the different sections of the brushes. Springs 19 are interposed between the rocking plate 18 and the tops of the brushes, so that an even tension may be maintained upon all the sections. In this form the tops of the sections 10 are not cut away and the brush fills the holder without the use of the cap 14 shown in Figs. 1 to 4.

In Fig. 7 I have shown a somewhat similar modification, in which the rocking plate 18 assumes the form of the cap 14 shown in the Figs. 1 to 4. In this case the cap 14 is loose enough over the sections to allow of a rocking motion, such as is proper to the plate 18. Instead of employing the rocking spider 16 or the plate 18 with the springs 19, I may employ a rocking spider such as shown in Figs. 8 and 9 for distributing the pressure equally among the brush sections. This spider is formed in a general cone shape having a top portion 20 and arms 21 which are slotted as shown at 19 for surrounding the pig tails 11. This form of spider may be employed with the cap 14 or without, and the spider may be formed of spring material in order to have an inherent resiliency, or it may be made rigid and depend upon the tension of the spring for forcing the entire brush down upon the collector ring.

In Fig. 10 I have illustrated the manner in which a pair of these brushes may be mounted in the usual brush holder employed on alternating-current machines. This brush holder comprises an open rectangular frame 21, having arms 22 and 23 at the sides thereof for supporting the main spring tensioning means. Each of the spring tensioning means 24 and 25 comprises a plate 26 having upturned bearings 27 and 28, which support a shaft 29. The bearing 28 is provided with a plurality of ratchet teeth for engaging the end 30 of the spring 31, which is coiled about the shaft 29. The other end 32 of the spring 31 engages ratchet teeth formed on the hub of the swinging arm 33. The arm 33 is freely rotatable on the shaft 29, and, being secured to the end 32 of the spring 31, the outer end of the arm is pressed against the top of the brush with a degree of tension varying on the setting of the spring. The tension of the spring may be increased or decreased at will by setting either the end 30 or the end 32 so as to increase or decrease the tightness with which it is wound on the shaft 29. The outer end of the arm 33 has a portion 34 standing substantially vertically and engaging the top of the spring at about its central portion. Each brush is pressed down by its arm 33 with a certain degree of tension sufficient to cause good contact between the brush and the collector ring. In case of unevenness in the ring the section which is raised will cause, through the rocking of the spider 16, a depression of the other sections of the brush, and thus all of the sections are maintained in good contact with the collector ring.

It is obvious that, instead of employing a pair of brushes in the holder 21, I may employ a single brush with a single tensioning arm 33. In the forms of brush which employ the cap 14 the end of the arm 33 rests upon this cap and the pressure is distributed by the springs or the spider beneath the cap.

Attention is called to the advantage secured by connecting the leads at suitably distributed points on the cross section of the brush. In the type of brush I have described the current density is very great and it is highly desirable to employ the full section of the brush for conducting current. When a central connection of the leads or pig tails in the body of the brush is made there is a bad distribution of current due to the concentration of the current upon the center of the brush. By connecting the leads at suitably spaced points, I secure a better distribution of current in the body of the brush and secure results that are markedly superior to the old method of connection even though the outer ends of the leads are all connected together as formerly.

Another striking advantage results from the subdivision or lamination. When the brush is employed for commutating service the short circuit current through the body of the brush is markedly reduced. In metallic brushes the short circuiting of sections produces a local heating in the brush and a heavy magnetic armature reaction in the armature. In the brush above described the path of conduction for a short circuit coil is through the brush section, its attached lead, down through the adjacent lead, and to the other brush section. This path is approximately four times the resistance of both leads and brushes in parallel and serves quite effectively to cut down the short circuit current. To increase this effect, I employ a spacer or barrier of high resistance or insulating material.

The one idea embodied in all these forms is the employment of rigid or block brushes divided into sections, each individual section being bodily movable and held under spring tension which will give the proper amount of total pressure on the brush, and then employing a secondary or distributing means for distributing this tension among the various sections evenly so as to maintain a constant electrical contact between the sections and the collector ring in spite of the rolling and pitching or the various eccentricities, etc., of the ring itself. It is clear that if perfect contact always existed between a solid block brush and the collector ring there would be a very satisfactory action, but, inasmuch as this theoretically perfect action is never obtained in practice, I find that it is necessary to employ some means such as outlined above in order to meet the extraordinary conditions which constantly occur in practice and which cause damage, such, for instance, as a chip or grain of dirt getting under the brush, or a bruise or an irregularity on the collector ring itself, or a shifting of the brush in its holder, which causes the brush to become overloaded at one particular spot or point, and possibly burned, or the collector ring itself roughened; and, while I have described with considerable particularity some embodiments of my invention, it is to be understood that I do not intend to limit myself to any particular details of construction except as the same are set forth in the appended claims.

It is apparent that numerous changes in form and dimensions will at once suggest themselves to those skilled in the art, but I consider such changes, modifications and variations to come within the spirit and scope of my invention as outlined in the following claims.

What I claim as new and desire to secure by Letters Patent of the United States is the following:

1. In a brush for electrical machinery, a plurality of independent rigid brush sections, a stationary holder for supporting said individual sections laterally, said sections being longitudinally movable in said holder, a spring pressed arm for imposing a definite total pressure upon all of the sections, equalizing means contacting with said sections for subdividing and distributing the total pressure upon said independent sections, said arm having a single central connection with said equalizing means, and leads connected to said individual sections.

2. In a brush for electrical machinery, a stationary holder, a plurality of independent sections symmetrically arranged in said holder and longitudinally movable in said holder, said sections comprising rigid blocks, means for imposing a definite total pressure upon all the sections, and pivoted rocking means common to all of said sections to distribute the pressure among said independent sections, each section bearing a proportionate part of the total pressure imposed by said first means.

3. In a brush for electrical machinery, a relatively stationary holder, a plurality of independent brush sections in said holder, each of said sections being independently movable longitudinally in said holder to take up inequalities in the coöperating contact surface, a spring pressed arm mounted on said holder and spring means to apportion the pressure of said arm upon the individual sections, said arm having a rounded end resting centrally upon said spring means.

4. In a brush for electrical machinery, a relatively stationary holder comprising a rectangular frame, independent rigid brush sections symmetrically arranged in said holder, each of said sections being movable longitudinally in said holder to take up inequalities in the coöperating contact surface, spring means on said holder for imposing a given total pressure upon all of the sections, spring equalizing means to apportion the pressure among the independent sections and individual leads connected to each of said sections, said first spring means having a single central connection with said spring equalizing means.

5. In a brush for electrical machinery, a relatively stationary holder comprising an open rectangular frame, a plurality of independent brush sections in said holder, said sections being longitudinally movable in said holder, a movable cap above the top of said sections, means for imposing a given total pressure upon said sections, said means resting upon one side of said cap and means for subdividing and distributing said pressure among the individual sections, said means being located between the other side of said cap and said sections.

6. In a brush for electrical machinery, a relatively stationary holder, a plurality of independent brush sections in said holder, said sections being longitudinally movable, a movable cap above the tops of said sections, means for imposing a given total pressure upon said sections, said means resting upon the top of said cap, and spring means for subdividing and distributing said pressure among the individual sections, said means being located between said cap and said sections.

7. In a brush for electrical machinery, a relatively stationary holder, a plurality of independent conducting brush sections longitudinally movable in said holder, a spring-pressed arm mounted on said holder for imposing pressure upon said sections, a rocking spider plate above said sections, said plate adapted to receive the pressure of said arm, said plate having spring means for distributing the pressure among said sections.

8. In combination a relatively stationary holder comprising an open rectangular frame, a plurality of independent rigid movable sections in said frame common spring means for said sections mounted on said holder, individual spring means for subdividing and distributing the pressure of said common spring means among the sections, said common spring means having an arm for applying pressure to said individual spring means, individual pigtail connections for each section, and means for joining a plurality of said pigtails together at their outer ends.

9. In a brush for electrical machinery, a stationary holder, rigid individual brush sections, a cap common to said sections, spring means resting on said cap, and individual springs for said sections between said cap and said sections.

10. In combination, a stationary holder, a plurality of individual rigid brush sections, a cap common to said sections, a spider common to said sections and secured to said cap, said spider having individual spring means for each section.

11. In combination a stationary brush holder, individual rigid brush sections, a common spring arm for said sections and a common rocking spider plate for said sections, said spider plate having individual arms for each of the sections, the end of said common arm resting centrally upon said spider plate to permit of free rocking motion.

12. In combination, a stationary brush holder, a plurality of rigid individual brush sections, a spring arm common to said sections, and a common rocking spring spider plate for said sections, said arm having its end resting centrally upon said plate to form a pivotal connection.

13. In combination, a stationary brush holder, a plurality of separate rigid brush sections, guide plates between said sections, a cap common to said sections, and individual spring means for each section.

14. In combination, a stationary brush holder, a plurality of independent brush sections, guide plates between said sections, a cap common to said sections and secured to said guide plates, and individual spring means for each section, said means connected to said cap.

15. In combination, a stationary brush holder, a plurality of individual brush sections, a cap common to said sections, guide plates between said sections and secured to said cap, a spider connected to said cap, said spider having individual arms for said sections.

16. In combination a stationary holder comprising an open frame, a plurality of rigid prismatic brush sections arranged to slide freely in said frame to take up inequalities in the sliding contact surface, one of said sections being arranged to make contact with said surface relatively in front of another with respect to the line of movement of the surface, spring means for imposing a predetermined pressure upon the sections as a whole, separate means for subdividing and distributing the total pressure among said individual sections and means between the spring and said separate means for transmitting the pressure of said spring.

17. In combination a brush holder comprising a stationary open rectangular frame, a brush in said frame, said brush comprising a plurality of rigid brush sections movable independently in and out in said frame, a spring pressed arm common to all of said sections, said arm holding said brush as a whole upon its bearing surface, and independent rocking spring means having symmetrical contact with the individual sections, said spring pressed arm bearing upon the center of said rocking means.

18. In combination, a relatively-stationary brush-holder comprising an open rectangular frame, a brush in said holder, said brush being divided in breadth and width to form a plurality of longitudinal sections, spring means to impose a given total pressure upon said sections, and a spring equalizing member for distributing the pressure among said individual sections, said equalizing member being capable of rocking sidewise and lengthwise about the end of said spring means.

19. In combination, a relatively-stationary brush-holder comprising an open rectangular frame, a brush in said holder, said brush being divided in breadth and in width to form a plurality of longitudinal sections, means to impose a given total pressure upon said sections as a whole, said means comprising a spring-pressed finger, and a spring equalizing member for distributing the pressure among the said individual sections, said equalizing member being capable of rocking about the end of said finger as a pivot to equalize the pressure sidewise and lengthwise.

20. In combination, a brush holder comprising an open rectangular frame, a brush comprising a plurality of independent rigid blocks of conducting material comprising a mixture of a metal and carbon, slidable longitudinally in said frame, said blocks lying one behind the other with respect to the direction of rotation of the contact surface, and individual flexible wire leads projecting substantially axially into the ends of said blocks, said leads being soldered to the material of said blocks, said leads being connected together at their outer ends.

21. In combination a stationary brush holder comprising an open rectangular frame, a prismatic brush of rigid material, a plurality of stranded wire flexible leads having their ends projecting longitudinally into the material of the brush and being joined by intimate molecular union directly to the material of the brush and means joining the outer ends of said leads together, said leads being connected to said brush one behind the other with respect to the direction of motion of the coöperating contact surface.

22. In a brush holder, a spring spider plate comprising a bent plate of spring conducting material, having a plurality of arms and having slots in said arms to embrace leads or pigtails, all of said arms terminating in substantially the same plane.

23. In a brush holder, a prismatic brush, said brush being subdivided axially by planes at right angles to each other to form four prismatic sections, individual pigtail connections connected axially to each of said sections, a plate supported entirely on said sections above all of said sections, said plate having spring means for engaging each section individually, said spring means embracing said pigtails, said spring means terminating substantially in the same plane.

24. In combination a brush holder comprising an open frame, a brush movable longitudinally in said frame, said brush comprising a plurality of longitudinal sections independently movable in said frame, some of said sections lying behind others with respect to the direction of motion of the contact surface, said brush sections consisting of rigid conducting material comprising a mixture of metal and carbon, a flexible metallic lead for each section, each lead having one end projecting into the body of the corresponding section, substantially along the longitudinal axis, said lead being soldered directly to the material comprising the body of the brush.

25. In combination, a rigid prismatic brush section, said section consisting of a substance comprising an intimate mixture of carbon and a metal, said brush section having a recess projecting substantially along the longitudinal axis thereof and a twisted flexible stranded metallic conductor having its end projecting into said recess and filling the same, said conductor being soldered in said recess directly to the substance of said brush section.

26. In combination, three or more independent rigid brush sections arranged in a symmetrical group, a single stationary holder for supporting said sections, said sections being movable longitudinally in said holder, equalizing means contacting symmetrically with each of said sections and a spring pressed arm for imposing a predetermined total pressure upon all of said sections, said arm having its end resting upon the center of said equalizing means to permit rocking in different directions.

27. In combination, a rigid stationary brush holding means for holding a current collecting brush upon a commutator, a plurality of prismatic blocks or members comprising a current collecting brush, said blocks or members being purposely placed one closely behind another with respect to the direction of rotation of the commutator to engage adjacent sections or bars of the commutator and to limit the short circuit current, pigtails connected to said blocks or members, said pigtails being connected together at their outer ends, said pigtails being adapted to carry the current independently of the holder.

In witness whereof, I hereunto subscribe my name this 5th day of February, A. D. 1915.

EDMUND O. SCHWEITZER.

Witnesses:
  LESLIE W. FRICKE,
  ERNEST W. RAPALEE.